Figure 1:
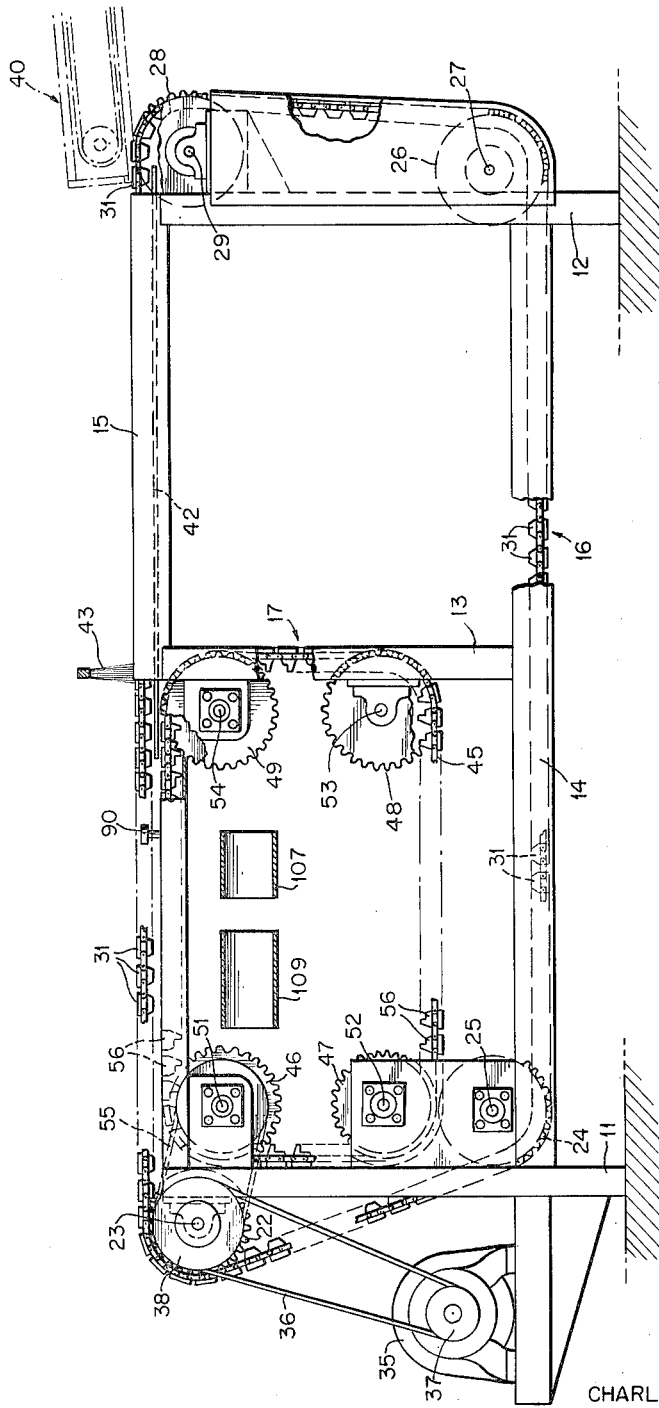

Feb. 15, 1966     C. G. P. OLDERSHAW     3,234,983
OKRA TRIMMING APPARATUS

Filed July 29, 1963     4 Sheets-Sheet 1

INVENTOR.
CHARLES G. P. OLDERSHAW

BY *[signature]*

ATTORNEY

Feb. 15, 1966  C. G. P. OLDERSHAW  3,234,983
OKRA TRIMMING APPARATUS
Filed July 29, 1963  4 Sheets-Sheet 2

Feb. 15, 1966  C. G. P. OLDERSHAW  3,234,983
OKRA TRIMMING APPARATUS
Filed July 29, 1963  4 Sheets-Sheet 3

Feb. 15, 1966   C. G. P. OLDERSHAW   3,234,983
OKRA TRIMMING APPARATUS
Filed July 29, 1963   4 Sheets-Sheet 4

3,234,983
OKRA TRIMMING APPARATUS
Charles G. P. Oldershaw, Avon, N.Y., assignor to General Foods Corporation, White Plains, N.Y., a corporation of Delaware
Filed July 29, 1963, Ser. No. 298,016
15 Claims. (Cl. 146—81)

This application refers generally to trimming apparatus for slicing an end off of elongate-shaped articles, the invention relating more particularly to trimming apparatus adaptable for automatic feed thereto of the articles to be trimmed and wherein the trimming is effected by slicing through said articles at a selected distance from one end thereof and in a plane which is perpendicular to the longitudinal axis of said article.

The invention is shown herein in an embodiment adapted for trimming whole okra. This vegetable comprises a pod substantially round in cross-section and having at one end thereof, i.e., the end to which is attached the stem of the okra, a cap which is a hard bulbous portion generally considered to be unedible. In preparing whole okra for human consumption it is necessary to trim the okra by removing the cap from the pod. It has been the practice heretofore to perform this trimming operation either by a purely manual operation of slicing off the cap with a knife or by employing trimming apparatus requiring that the okra be fed thereto by hand. Both of these modes of operation involve considerable amount of labor rendering them unnecessarily time consuming and consequently quite costly for satisfactory use in large volume commercial production of okra.

The apparatus according to the present invention includes conveyor means adapted to receive the okra fed thereto in a completely automatic manner, the okra having been pre-oriented so as to be delivered to the conveyor means cap end first. The apparatus for orienting the okra is disclosed and claimed in a separate application entitled "Okra Aligning Apparatus" of which I am coinventor with Robert V. King and William E. LaFerney. The conveyor means is comprised of a plurality of separate pockets adapted to receive and retain the okra in an upright position. The first stage of this conveyor feed path is designed so as to enable operator intervention to correct misfeeds which may occasionally result in transfer of the okra from the orienting apparatus, heretofore mentioned, to the conveyor means of the instant apparatus. Therefter, the okra are carried through a second feed stage wherein they are presented to a gauging means and an aligning mechanism, the gauging means determining the amount of the okra cap end to be removed by the cutting blade, the aligning means serving to adjust the attitude of the okra relative to the cutting blade so as to insure that the cut will be made along a plane perpendicular to the longitudinal axis of the okra thereby minimizing waste. The gauging means are adjustable to compensate both for varying thickness of the cap and also for variations in cap diameter and shape, since it is found that these characteristics of okra vary from one crop to another. The conveyor means then carries the okra into contact with the cutting blade whereupon the okra is severed, with the cap end and the remaining pod being delivered to separate conveyors for transfer to suitable receptacles.

It is, therefore, an object of the instant invention to provide on improved apparatus for trimming okra-like articles and adapted to receive said articles in an entirely automatic manner without the necessity of hand feed.

It is a further object of the invention to provide an improved apparatus for trimming okra-like articles adapted for automatic feed thereto and wherein misfeeds can be corrected before the articles are delivered to the trimming means.

It is a further object of this invention to provide an improved trimming apparatus for okra-like articles having gauging means adjustable to compensate for size and shape variations in the articles to be trimmed.

It is a further object of the invention to provide in a trimming apparatus for okra-like articles aligning means for adjusting the attitude of the articles relative to the cutting mechanism.

Figure 2:
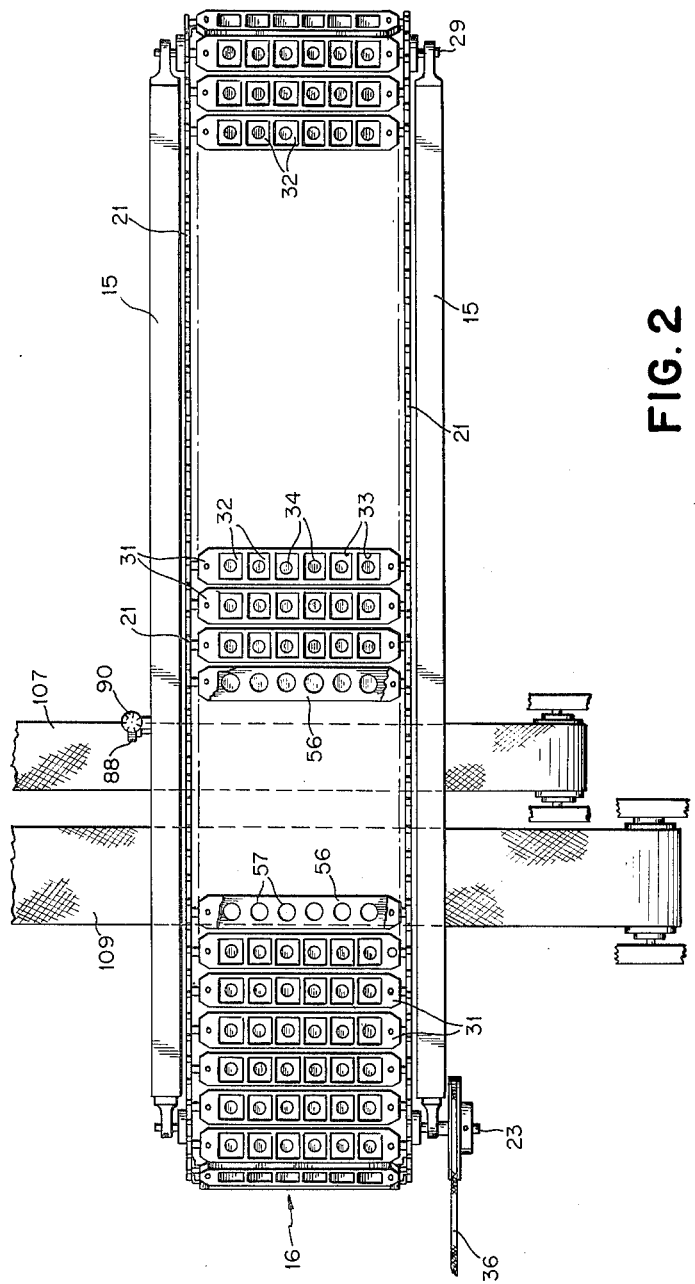
Figure 3:
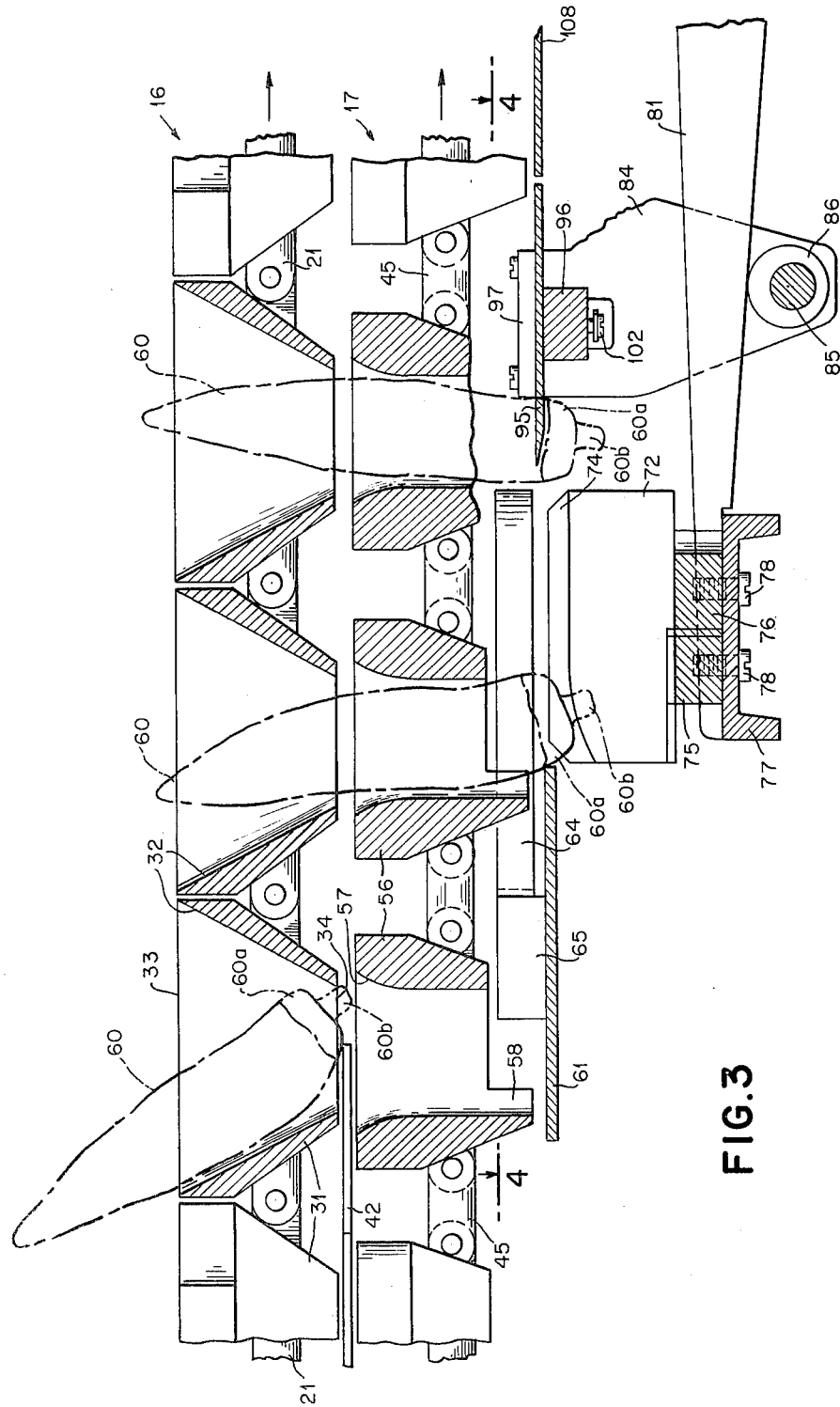
Figure 4:
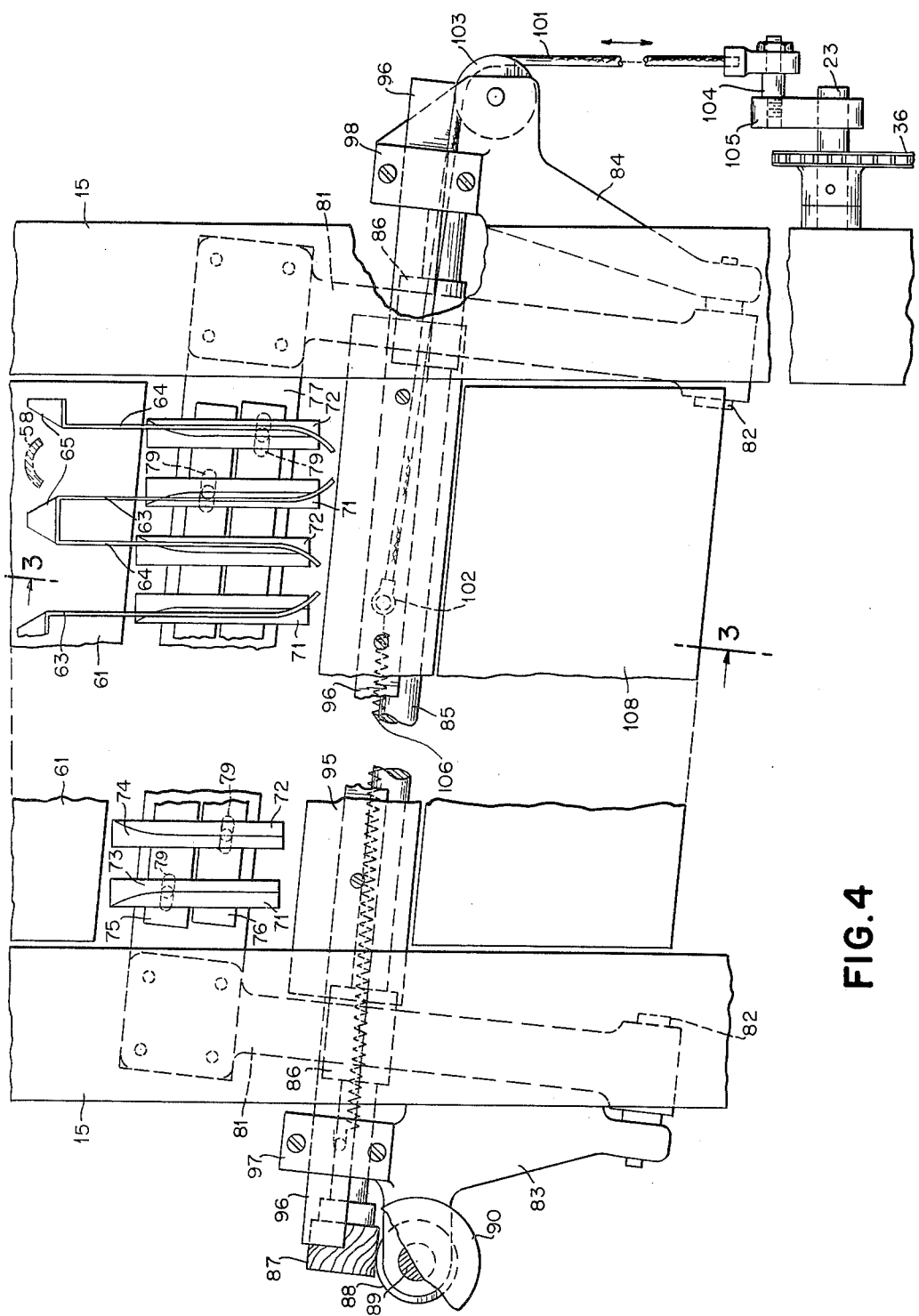

Further objects of the invention together with the features contributing thereto and the advantages accruing therefrom will be apparent from the following description when read in conjunction with the drawings wherein:

FIG. 1 is a view of the apparatus in side elevation;
FIG. 2 is a plan view of the apparatus;
FIG. 3 is an enlarged sectional view of the mechanism at the cutting zone of the apparatus, the view being taken along the line 3—3 of FIG. 4;
FIG. 4 is a sectional view of the mechanism ot the cutting zone, said view being taken along the line 4—4 of FIG. 3.

Referring now to the drawings, the apparatus is mounted on a framework which includes upright support posts 11, 12, and 13 and horizontal frame bars 14, 15, said frame members being duplicated on both sides of the machine so as to constitute an open framework mounting two endless conveyors 16, 17. Conveyor 16 is comprised of roller chains 21 strung in parallel, one at each side of the framework, each prescribing a vertically oriented loop. Each of said roller chains 21 is stretched around a plurality of sprockets which include the driving sprocket 22 carried by a shaft 23, sprocket 24 on shaft 25, sprockets 26, 28 carried by shafts 27, 29, respectively, each of said shafts being suitably journalled in the supporting framework. Disposed between and carried by the parallel running chains 21 of conveyor 16 are a plurality of trays 31, each shaped to define a row of bottomless pockets 32. The several trays thus provide an array of pockets arranged in intersecting longitudinal and transverse rows. Said pockets are formed with the contour of a funnel so as to provide a relatively large area top opening 33 of rectangular, preferably square, shape and a bottom opening 34 of reduced area and circular shape, the sidewalls of said pockets tapering inwardly from top to bottom so as to provide a smooth transitional surface between the square top opening and the circular bottom opening. Conveyor 16 is driven by a motor 35 through a chain 36 running from a motor driven sprocket 37 to a sprocket 38 mounted on the drive sprocket shaft 23, the drive of the conveyor being in a counterclockwise direction as viewed in FIG. 1 whereby along its upper horizontal flight the conveyor is caused to proceed from right to left.

As heretofore mentioned, the apparatus is designed for use with mechanism automatically feeding okra thereto, and as can be seen in FIG. 1, the input end of the conveyor 16 is disposed immediately below the discharge end of associated feeding mechanism 40 disclosed in said aforementioned application and which operates to discharge the okra vertically, with cap end lowermost, onto the conveyor 16 whereupon the individual okra are received endwise into individual pockets 32. By shaping the pockets 32 with a rectangular opening and mounting the trays 31 in closely contiguous relation one to the other, it will be seen that the construction presents a minimum of obstructing surfaces or interstitial area between the several pockets to interfere with the free fall and transfer of okra from the associated feeding mechanism into one of the pockets 32 of the instant apparatus.

Underlying the pockets 32 for a portion of their horizontal flight between sprockets 28 and 22 is a dead plate 42 over which the cap ends of the okra ride thereby preventing full penetration of the pockets by the okra which are considerably longer than the depth of pockets 32. That portion of the conveyor feed path running from the input area beneath the feeding mechanism 40 to the end of the dead plate 42 may be considered as a first feeding stage wherein the upper or tip end of the okra protrudes substantially above the top opening of the pockets 32 so as to permit a visual check by an attendant of the correctness of feed and to enable a correction of misfeeds by the attendant such as in rare instances wherein an okra may have entered a pocket tip end first, or two okra may have penetrated into the same pocket. If desired, a brush 43 may be disposed over the conveyor 16 at the termination of the first feeding stage so as to clear away any okra which through a misfeeding function might be lying sidewise across the top of one or more pockets 32 of the conveyor.

Upon riding off the end of dead plate 42, the okra are permitted to penetrate more fully the conveyor pockets 32 whereupon they come under the influence of conveyor 17, which point may be regarded as beginning of the second feeding stage. Conveyor 17 is comprised of roller chains 45, there being one chain at each side of the machine, each chain being strung around a set of sprockets 46, 47, 48, 49, mounted on shafts 51, 52, 53, 54, respectively. Conveyor 17 is driven through a drive chain 55 operatively coupling shaft 51 with shaft 23 in such a manner as to cause the velocity of the two conveyors to be identical. Supported by the chains 45 of conveyor 17 are a plurality of trays 56 each defining a transverse row of bottomless pockets 57. Each pocket 57 when disposed along the horizontal upper flight of conveyor 17 between sprockets 49, 46 registers in vertical alignment with one of the pockets 32 of the conveyor 16. The shape of the pockets 57 is substantially cyclindrical, the diameter thereof being substantially the same as the diameter of the lower opening 34 of pockets 32, the sidewalls of pockets 57 flaring outwardly towards their uppermost opening so as to facilitate penetration thereof by an okra when riding off the end of the dead plate 42. The portion of the trays 56 defining the lower opening of the pockets 57 is partially cut away, i.e., at the leading edge and sides of the pocket so as to leave remaining a downwardly projecting rear or trailing edge segment 58 of the pocket for reasons which will hereinafter be apparent. A dead plate 61 disposed beneath the pockets 57 limits the dropping of the okra through the pockets, each okra at this point lying partly within a pocket 57 of the lower conveyor 17 and partly within a pocket 32 of the upper conveyor 16. In FIG. 3 there is shown an okra 60, having a cap 60a to which is attached a short stem portion 60b, in each of three successive pockets of the respective conveyor systems. The trailing okra in the rearmost pocket of conveyor 16 indicated in FIG. 3 is shown in the position at which it rides off the end of the dead plate 42 and starts to drop endwise into the lower pocket 57, and in so doing it will be apparent that it tends to straighten up into a more vertical attitude due to the reduced dimensions of the aforesaid lower pocket. As the okra is carried along the dead plate 61 it is introduced into an aligning means of which there is one associated with each longitudinal row of pockets of the conveyor systems. Each aligning means comprises a pair of resilient aligning fingers 63, 64, which are supported at their rearward ends by bevelled blocks 65 secured to the top surface of the dead plate 61. The fingers 64, 63 of each pair extend longitudinally in the direction of conveyor travel and curve inwardly at their forward ends. One function of the aligning fingers 63, 64 is to align the cap ends of the okra with the center line of the pockets 57 preparatory to delivery of the okra to gauging means disposed at the forward end of the dead plate 61. The fingers 63, 64 are able to engage the okra due to the trays 56 being partially cut away at the front and sides of the lower openings of the pockets 57.

The gauging means, of which there is one for each longitudinal row of pockets, serve to position the okra vertically relative to the cutting means, without regard to the length of stem 60b which may be left on the okra. Each gauging means comprises a pair of bars 71, 72, the upper surface of which is bevelled at its inner edge so as to provide in effect an open V-shaped trough in which rides the cap 60a, the space between the bars 71, 72 accommodating whatever length of stem 60b may be left on the okra. In this way the elevation of the okra is determined from the cap itself rather than from the stem which may vary in length considerably from one okra to another. The bevelled edges 73, 74 of the gauge bars 71, 72, respectively, are flared both outwardly and downwardly at the receiving ends of the bars to permit a smooth transition of the okra from the dead plate 61 to the bars. The bars 71 of each pair are secured to a transverse supporting rib 75 while the bars 72 of each pair are secured to a transverse support rib 76. The ribs 75, 76 are adjustably secured to a support beam 77 by means such as bolts 78 threaded into the gauge bars and extending through slotted openings 79 formed in the beam 77. This adjustment enables the lateral spacing between the bars 71, 72 of each pair to be varied to make allowance for seasonal changes in the shape of the cap of the okra which at times may be predominantly convex and at other times may be predominantly concave, which variation in shape may not be entirely compensated for by vertical adjustment of the gauge bars in the manner hereinafter described.

In order to enable vertical adjustment of the gauge bars, the ends of the support beam 77 are secured to arms 81 each of which mounted for pivotal movement on studs 82 secured in brackets 83, 84, forming part of the machine framework. Suitably journalled in said brackets is a shaft 85 carrying a pair of eccentric cams 86 each bearing on the under surface of an arm 81. One end of shaft 85 carries a wormwheel 87 engaging with a wormgear 88 carried by a vertical shaft 89 also journalled in the frame bracket 83. A hand operated knob 90 mounted on the top end of the shaft 89 enables the shaft 89 and the shaft 85 to be rotatively adjusted which, through operation of the eccentric cams 86, adjusts the elevation of each pair of the gauge bars 71, 72 relative to a horizontally disposed cutting blade 95 to thereby determine the longitudinal depth at which the cut is to be made.

From the foregoing and with particular reference to FIGS. 3 and 4, it will be seen that as the okra is carried along the dead plate 61 by the combined action of conveyors 16, 17, with the okra riding on its stem portion 60b, the okra will be carried between the opposed resilient fingers 63, 64 of an associated aligning means which will guide the cap end 60a of the okra along the center line of the pocket 57 and the center line of the associated gauging means. Accordingly, as the okra rides off the dead plate 61 the stem portion 60b will drop into the space between the two bars 71, 72 of the associated gauging means permitting the cap 60a to ride on the bevelled surfaces 73, 74 of the gauging means as shown by the intermediately depicted okra in FIG. 3. The centering function of said aligning means or members 63, 64 is of particular usefulness with respect to okra which may be of less than maximum size and therefore could be carried in off centered relation to said pockets, since the diameter of the pockets 57 must necessarily be of a dimension adequate for accommodating okra of maximum size. After the okra is carried across the bars 71, 72 of the associated gauging means it is yieldably engaged near its cap end by the inwardly bent ends of the associated aligning fingers 63, 64 which tend to yieldably restrain its forward movement so as to urge the lower end of the okra back against the rear or trailing surface of the pocket 57 and the projecting pocket segment 58. This action causes the okra to assume a vertical upright attitude within the pocket 57 so that the cut by the blade 95 will be in a plane perpendicular to the longitudinal axis of the okra as indicated by the leading okra depicted in FIG. 3.

The cutting blade 95 is mounted on a transverse bar 96 slide-fitted in bearings 97, 98 formed in the frame brackets 83, 84, respectively. It should be noted that the cutting blade 95, as best seen in FIG. 4, is disposed with its cutting edge extending along a line running obliquely to the direction of conveyor travel, the gauging means being similarly arranged along an oblique line parallel to the cutting edge of the knife. This arrangement serves to cut the okra contained in adjoining rows of the conveyor pockets in succession to thereby more evenly distribute the load on the cutting blade than would be the case if the blade were disposed perpendicular to the path of conveyor travel.

A reciprocatory motion is imparted to the cutting blade 95 so as to give it a slicing action rather than a mere shearing action. This reciprocatory motion is achieved by means of a cable 101 anchored at one end to a pin 102 on the underside of the knife support bar 96 and drawn about a pulley 103 mounted in the frame bracket 84 to connect with a stud 104 carried by a crank arm 105. Crank arm 105 is mounted on shaft 23 of the conveyor system 16 so as to pull and release intermittently the cutting blade 96 in cooperation with an expansion spring 106 connecting the blade support bar 96 with the frame bracket 84, thereby providing a reciprocatory motion to produce the desired slicing effect by the blade 95.

As soon as the okra is drawn past the cutting edge of the blade 95, the cap end will be completely severed from the remaining pod portion and will accordingly drop on to a conveyor belt 107 provided therefor, see FIG. 1, said conveyor belt transporting the cap ends to a suitable receptacle, not shown. The remaining pod portion of the okra continues to ride over the top surface of the blade 95 and thence on to a dead plate 108. Upon reaching the forward edge of the dead plate 108 it drops on to a conveyor belt 109 for delivery to and collection in a separate receptacle, not shown.

From the foregoing it will be apparent that the unique interaction between the two conveyor systems, 16, 17 affords advantageous results which could not be effected by provision of only one conveyor system since the arrangement, due to the design of pockets 57, enables the okra to be suitably oriented and aligned for the trimming action while the pockets 32, due to their design and the separate feeding stage provided thereby, minimize the chances of misfeeds and, further, afford the opportunity for correcting misfeeds in the rare instances when such might occur. It will also be apparent that the dual adjustability of the gauging means, both as to elevation of the bars 71, 72 and the lateral spacing between the bars, serves to adequately meet the various physical characteristics of okra which have been found to differ from one crop to another for various reasons which may be the result or ordinary seasonal changes, climatic conditions, soil conditions, etc.

While there has been shown and described what is considered to be a preferred embodiment of the invention, it will of course be obvious that changes in form could be made without departing from the spirit of the invention, and it is therefore intended that the invention be not limited to the exact form herein shown and described, nor to anything less than the whole of the invention hereinbefore set forth as hereinafter claimed.

What is claimed and desired to be secured by Letters Patent is:

1. Apparatus for trimming okra by removing the cap end thereof, said cap end having a stem portion appended thereto, comprising, endless conveyor means arranged to progress along a horizontal flight, said conveyor means comprising a plurality of bottomless pockets each adapted to receive an individual whole okra endwise when presented thereto in a substantially upright attitude with the cap end thereof lowermost, dead plate means underlying a predetermined extent of said flight for supporting the okra within said pockets, cutting blade means horizontally disposed to provide a cutting edge intersecting the horizontal flight of that portion of the okra projecting below said pockets for severing the cap ends from said okra, and adjustable gauge means fixedly disposed between said dead plate means and said blade means and arranged to support said cap end by engagement with the cap end surface at opposite sides of said stem portion for determining the elevation at which the okra is presented to said blade means to thereby uniformly control with respect to okra having cap ends of varying configuration the length of the cap end trimmed off said okra by said blade means.

2. The invention according to claim 1 wherein said gauge means comprise a pair of spaced apart stationary bars, the upper surfaces of which are formed to engage and support said cap end at opposite sides of said stem portion, the space between said bars being adapted to receive and permit unobstructed passage of the stem portion appended to said cap end.

3. The invention according to claim 2 wherein said bars are adjustably mounted to enable variable spacing between the bars to accommodate okra having cap ends of varying dimensions and configuration.

4. The invention according to claim 1 wherein the means for adjusting said gauge means to determine the elevation at which the okra is presented to said blade means includes camming members operatively engaging the support for said gauge means and selectively adjusted by operation of a manually rotatable member.

5. The invention according to claim 1 wherein said pockets are arranged along intersecting rows extending parallel to and perpendicularly to the direction of conveyor travel, and wherein the cutting edge of said blade means extends along a line oblique to the direction of conveyor travel to thereby trim in succession the individual okra being conveyed in pockets of the same perpendicular row.

6. The invention according to claim 1 including means for imparting reciprocating motion to said blade means to provide said blade means with a slicing action.

7. Apparatus for trimming okra by removing the cap end thereof, said cap end having a stem portion appended thereto, comprising, endless conveyor means arranged to progress along a horizontal flight, said conveyor means comprising a plurality of bottomless pockets each adapted to receive an individual whole okra endwise when presented thereto in a substantially upright attitude with the cap end thereof lowermost, dead plate means underlying a predetermined extent of said flight for supporting the okra within said pockets, cutting blade means horizontally disposed to provide a cutting edge intersecting the horizontal flight of that portion of the okra projecting below said pockets for severing the cap ends from said okra, adjustable gauge means fixedly disposed between said dead plate means and said blade means and arranged to support said cap end at opposite sides of said stem portion for determining the elevation at which the okra is presented to said blade means to thereby control the amount of the cap end trimmed off said okra by said blade means, and aligning means disposed to engage said okra when supported by said gauge means to orient the okra into a vertical attitude to cause the cut made by said blade means to extend in a plane perpendicular to the longitudinal axis of said okra.

8. The invention according to claim 7 wherein said aligning means includes a pair of spaced apart flexible members overlying said gauge means and adapted to bear on opposite sides of said okra while traversing said gauge means, the forward ends of said flexible members being bent inwardly towards one another to yieldably restrain the forward motion of said cap end and thereby urge said cap end against the rearward wall of the associated conveyor pocket to thereby orient the okra vertically within said pocket.

9. The invention according to claim 7 wherein said aligning means includes a pair of spaced apart elongate flexible members adapted to engage opposite sides of the okra near its cap end during the transfer of said okra from said dead plate means to said gauge means, said flexible members yieldably centering the okra relative to the center line of said pockets to thereby guide the stem portion into the space between the bars of said gauge means.

10. In an okra trimming apparatus adapted for use with associated mechanism automatically feeding okra thereto in an upright position with the cap ends thereof lowermost, a first conveyor arranged to progress over a horizontal flight and comprising a plurality of bottomless pockets each adapted to receive an individual whole okra when delivered thereto in a substantially upright attitude by said associated mechanism for conveying the okra through a first feeding stage, dead plate means underlying the horizontal flight of said conveyor throughout said first feeding stage for supporting the okra in said pockets, a second conveyor driven at the same velocity as said first conveyor and arranged to progress over a horizontal flight running beneath and codirectionally with the horizontal flight of said first conveyor, said second conveyor comprising a plurality of bottomless pockets registering vertically with the pockets of said first conveyor, the horizontal flight of said second conveyor beginning at the terminal end of said dead plate means and defining a second feeding stage, the pockets of said second conveyor being adapted to receive okra from the pockets of said first conveyor at the start of said second feeding stage, and means disposed below the horizontal flight of said second conveyor for effecting the trimming of the okra cap ends projecting below the pockets of said second conveyor during said second feeding stage.

11. The invention according to claim 10 wherein each of said first and second conveyors are endless and proceed over orbits lying in a common plane, the orbit of said second conveyor being disposed interiorly of the orbit of said first conveyor.

12. The invention according to claim 10 wherein said first conveyor at the beginning of its horizontal flight is disposed beneath the discharge end of said associated mechanism for receiving in its said pockets okra dropped endwise from said associated mechanism.

13. The invention according to claim 10 wherein the pockets of said first conveyor have depth less than the length of said okra, whereby a substantial portion of one end of said okra projects above said pockets while traversing said first feeding stage.

14. The invention according to claim 10 wherein the pockets of said first conveyor are arranged in perpendicularly intersecting rows, and wherein each said pocket is funnel-shaped and formed with a relatively large top opening of rectangular configuration to minimize the interstitial areas between the top openings of adjacent pockets.

15. In an okra trimming apparatus adapted for use with associated mechanism automatically feeding okra thereto in an upright position with the cap ends thereof lowermost, a first endless conveyor arranged to progress over a horizontal flight and comprising a plurality of bottomless pockets each adapted to receive an individual whole okra when delivered therto in a substantially upright attitude by said associated mechanism for conveying the okra when delivered thereto in a substantially upright attitude underlying the horizontal flight of said conveyor throughout said first feeding stage for supporting the okra in said pockets, a second endless conveyor driven at the same velocity as said first conveyor and arranged to progress over a horizontal flight running below and co-directionally with the horizontal flight of said first conveyor, said second conveyor comprising a plurality of bottomless pockets registering vertically with the pockets of said first conveyor, the horizontal flight of said second conveyor beginning at the terminal end of said dead plate means and defining a second feeding stage, the pockets of said second conveyor being adapted to receive okra from the pockets of said first conveyor at the start of said second feeding stage, means underlying the horizontal flight of said second conveyor for supporting said okra at an elevation at which the cap ends project below the pockets of said second conveyor, and cutting blade means horizontally disposed to provide a cutting edge intersecting the horizontal flight of that portion of the okra projecting below the pockets of said second conveyor for severing the cap ends from said okra while being carried past said blade means.

References Cited by the Examiner

UNITED STATES PATENTS

| | | | |
|---|---|---|---|
| 1,592,401 | 7/1926 | Walker | 146—151 |
| 2,435,762 | 2/1948 | Urschel | 146—81 |
| 2,486,367 | 10/1949 | Abrey et al. | 146—81 X |
| 2,696,234 | 12/1954 | Trappey | 146—81 |
| 2,858,866 | 11/1958 | Hendry | 146—81 |
| 3,062,250 | 11/1962 | Kressin | 146—83 |

ROBERT C. RIORDON, *Primary Examiner.*

J. SPENCER OVERHOLSTER, *Examiner.*